(No Model.) 2 Sheets—Sheet 2.
T. McI. YARBROUGH.
CORN AND COTTON SEED PLANTER AND FERTILIZER DISTRIBUTER.
No. 437,075. Patented Sept. 23, 1890.
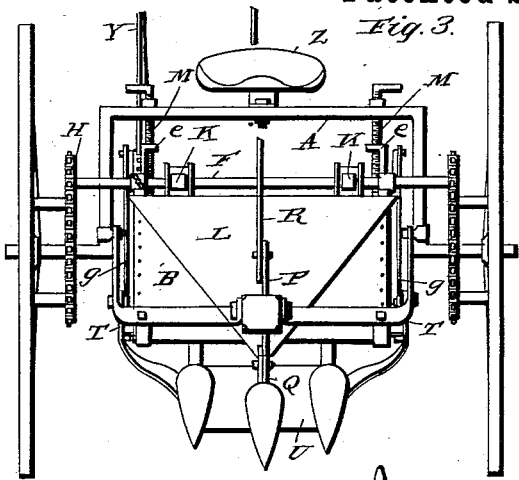
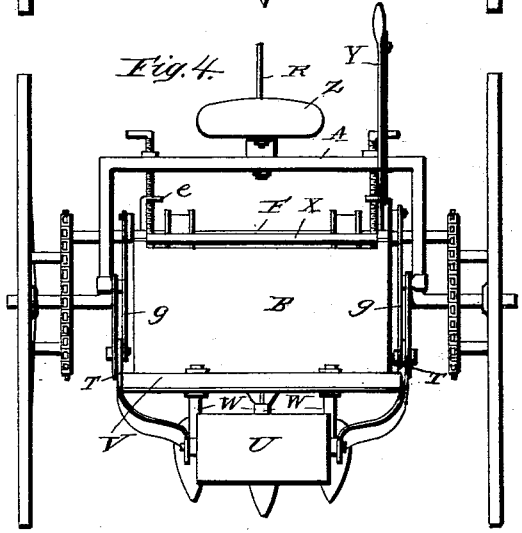
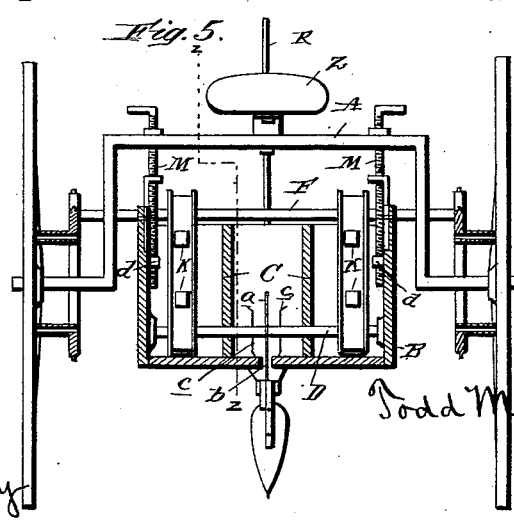

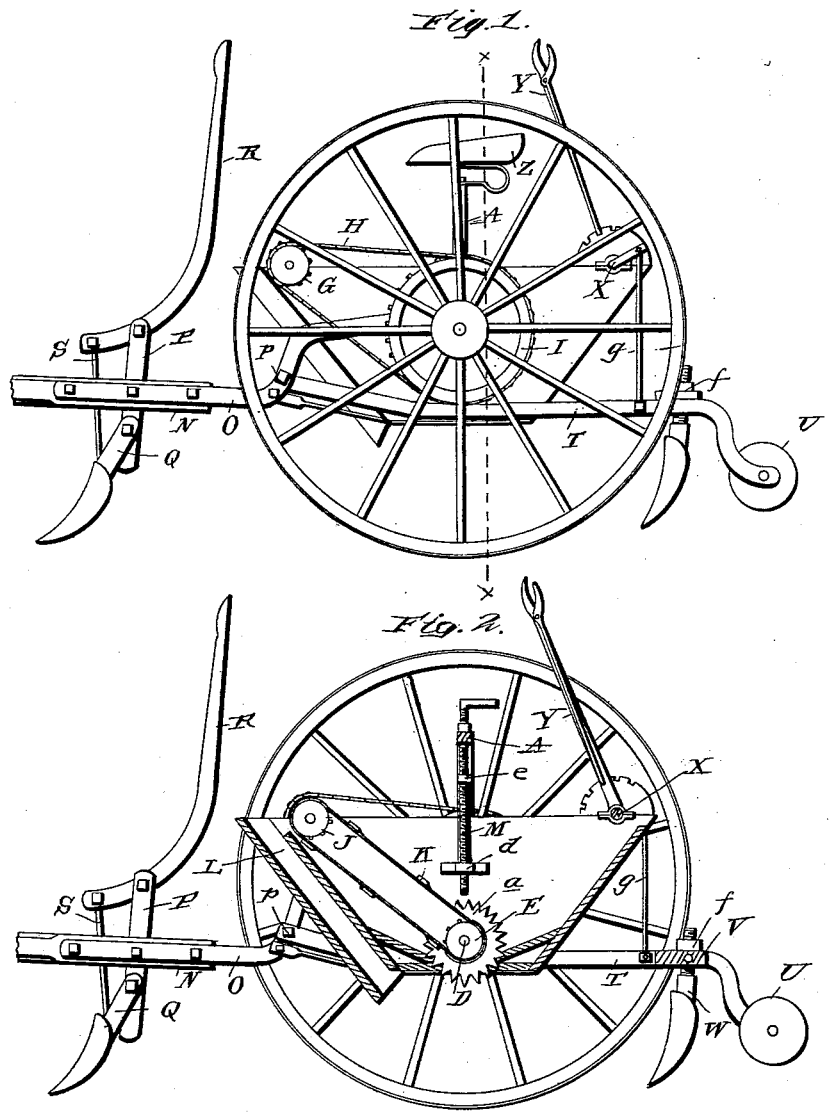

UNITED STATES PATENT OFFICE.

TODD McINTIRE YARBROUGH, OF SHREVEPORT, LOUISIANA.

CORN AND COTTON-SEED PLANTER AND FERTILIZER-DISTRIBUTER.

SPECIFICATION forming part of Letters Patent No. 437,075, dated September 23, 1890.

Application filed February 12, 1890. Serial No. 340,132. (No model.)

*To all whom it may concern:*

Be it known that I, TODD MCINTIRE YARBROUGH, a citizen of the United States, residing at Shreveport, in the parish of Caddo and State of Louisiana, have invented certain new and useful Improvements in a Combined Corn and Cotton-Seed Planter and Fertilizer-Distributer; and I do declare the following to be a full, clear, and exact description of the invention, such as will enable others skilled in the art to which it appertains to make and use the same.

My invention has relation to improvements in combined corn and cotton planters and fertilizer-distributers; and it consists in the construction, novel combination, and adaptation of parts hereinafter described and claimed.

In the accompanying drawings, Figure 1 is a side elevation of my improved machine complete in an operative position. Fig. 2 is a vertical longitudinal sectional view of the same, taken on the line $z$ $z$ of Fig. 5. Fig. 3 is a front elevation. Fig. 4 is a rear elevation; and Fig. 5 is a transverse sectional view taken on the line $x$ $x$, Fig. 1.

Referring to the said drawings by letter, A indicates a crank-axle of the ordinary construction, which is provided in its top horizontal bar adjacent to the ends thereof with vertical screw-threaded openings, for a purpose hereinafter explained.

B indicates the body or bed of the machine, which is preferably of a rectangular form and of a depth sufficiently great to carry the requisite quantity of the respective seeds and fertilizer. This body B is divided longitudinally into three compartments by intermediate longitudinal walls C, to provide separate compartments for the respective seeds and the fertilizer, the central compartment being designed for the latter.

D indicates a transverse shaft, which is journaled in bearings in the side walls of the body B adjacent to the bottom thereof, and on which are keyed sprocket-wheels E at points within the respective seed-chambers, which carry cup-belts, presently to be described.

$a$ indicates a notched wheel, which is keyed on the shaft D in the middle of the fertilizer-chamber and travels in a longitudinal slot $b$, cut in the bottom of the body for the discharge of the fertilizing substance, which is facilitated by the notched wheel, and radial agitator-arms $c$, also rigidly secured upon shaft D to the right and left of the notched wheel.

F indicates a transverse shaft, which is journaled in bearings upon the tops of the side walls of the body B at the forward portion thereof, said shaft being of a length slightly greater than the width of said body to adapt it to receive sprocket-wheels G upon its ends, on which travel chain belts H, which connect the said sprocket-wheels G with sprocket-wheels I, of a larger diameter, rigidly connected to and turning with the bearing-wheels of the machine, whereby motion is transmitted from the latter to the sprocket-wheels G and the transverse shaft F. This upper transverse shaft F is provided at points in its length within the respective seed-compartments with rigidly-secured sprocket-wheels J, on which travel the cupped belts K, also traveling upon the sprocket-wheels E of the lower shaft D. The cups upon the belts K are of a construction adapted to dip the seed at the bottom of the seed-apartments and carry it to the top forward edge of the body, where it is emptied into a discharge hopper or conveyer L, arranged upon the forward wall of the body, by which it is carried to the ground.

L indicates the discharge spout or conveyer for the seed, which is arranged upon the forward wall of the body B and rigidly attached thereto. This discharge-spout L is of a width at its top similar to the width of the body B; but it gradually decreases in its descent to the bottom of the body, where it terminates in a spouted portion, as better shown in Fig. 3 of the drawings.

$d$ indicates inwardly-projecting lugs or nuts, which are secured to the inner side walls of the body and are provided with vertical screw-threaded openings.

$e$ indicates vertically-extending metal straps or plates, which are also attached to the inner side walls of the body. These straps $e$, which extend above the top of the body B, are provided at their tops with inwardly-projecting bent portions having vertical screw-threaded openings in the same vertical line as the threaded openings of the nuts $e'$, both of which are designed to receive a vertical threaded rod M, which extends upwardly and passes through the threaded openings (previously described) in the top horizontal bar of the crank-axle. These vertical rods M, which are provided at their tops with bent handle portions, are designed to raise and lower the bed or body of the machine with respect to the axle thereof.

N indicates the tongue or pole of my improved machine, which is connected with the axle thereof by curved metal straps or bars O, which are secured by bolts to the sides of the pole and extend back to the axle, to which they are secured by suitable clip-irons, as illustrated. This pole N is provided at a point adjacent to its inner end with a longitudinal slot for the reception and play of certain levers now to be described.

P indicates a vertical bar or rod, which is rigidly secured in the said slot or recess of the pole at about the middle thereof by a bolt or other suitable means, and which extends equidistant above and below the same. This rod P is provided at points adjacent to its top and bottom with transverse bolt-holes, and it has pivoted to it at its lower end a cultivator-arm Q, provided with a cultivator-blade designed and adapted to open a furrow for the reception of the seed and fertilizer.

R indicates a lever-arm, which is fulcrumed on a bolt journaled in the upper bolt-hole of the rigid arm P, and which extends up to a point within easy reach of the driver, its weight or lifting portion being carried slightly forward of the fulcrum-point and provided at a point adjacent to its end with a bolt-aperture to receive a bolt, which in turn provides a pivot for a depending rod S, which is connected at its lower end to the cultivator-arm Q, adjacent to the lower end thereof, whereby the same may be raised and lowered by application of power to the handle portion of the lever R.

T indicates two metal straps or bars for the attachment to the axle of the machine of the rear covering-plows and rollers which follow the drill portion and cover and roll the seed after its deposit in the ground. These straps T are secured in a pivoted manner at their forward ends to the straps O at a point in the upward curve thereof, and the said rear straps are bent slightly downward and extend rearwardly to a point a little in the rear of the body of the machine, where they are again bent down in a compound curve, the ends of which are provided with annular apertures to form journals for the reception of the shaft of a transverse roller U, which is of a preferable diameter and weight for the purpose designed.

V indicates a transverse beam or bar, which is secured to the rearwardly-extending straps T by bolts or other suitable means at a point slightly in advance of the compound-curved portion thereof. This bar V, which is of a suitable width, is provided at points in its length to the left and right of its middle with vertical bolt-apertures for the reception of the depending arms W of the covering-cultivators or plows. These depending arms W, which are threaded, as shown, are fastened in position in said transverse bar by securing-nuts $f$, the attachment being thus rendered adjustable.

The rearwardly-extending straps T are pivotally connected at $p$ to the straps O, as has been described, and they are provided at a point slightly in advance of the transverse beam with bolt-apertures to receive bolts for the connection to said straps of upwardly-extending lever-arms $g$, which are connected in turn at their upper ends to the outer ends of the crank portions of a rocking shaft X, which is journaled in bearings on the top of the side walls of the body adjacent to the rear end thereof. This rocking shaft X is provided at a point adjacent to one of the side walls of the body with a rigidly-secured lever-arm Y, carrying a spring locking-bar, the lower end of which engages notches in the periphery of an arc which is secured upon one of the side walls of the body adjacent to the lever-arm Y, whereby the covering-cultivators and rollers may be elevated or depressed and secured in position at any desired elevation.

Z indicates a driver's seat, which is provided with a suitable loop-spring and is secured to the top horizontal bar of the axle at a point preferably in the middle thereof.

Having described my invention, what I claim is—

1. In a seed-planter, the combination, with the crank-axle carrying bearing-wheels and provided in its top horizontal bar with vertical screw-threaded openings, of the body or bed provided on its side walls with lugs or nuts having vertical screw-threaded openings, and the vertical screw-threaded rods adapted to engage the threads in the openings of the axle and the lugs of the body, whereby the body is suspended and may be raised or lowered, substantially as specified.

2. The combination, with a seed-planter, of a tongue or pole secured thereto, provided at a point adjacent to its inner end with a longitudinal slot, a vertical bar rigidly secured in said slot, the cultivator-arm carrying a blade pivotally connected to the lower end of said rigid bar, the lever-arm fulcrumed at the upper end of the rigid bar, and the depending arm pivotally connecting the outer end of said lever with the cultivator-arm, whereby the same may be raised and lowered, substantially as described.

3. In a combined corn and cotton planter and fertilizer-distributer, the combination, with a crank-axle, of the body or bed depending therefrom, provided with longitudinal compartments for the reception of the respective seeds and fertilizer and a central longitudinal slot in its bottom for the discharge of the latter, the transverse shaft journaled in the side walls of the body adjacent to the bottom thereof and carrying sprocket-wheels rigidly secured thereto at points within the seed-chambers, a rigidly-secured notched wheel and agitator-arms within the middle or fertilizer chamber, the transverse shaft journaled on the tops of the side walls at the forward portion thereof, having rigidly-secured sprocket-wheels at its ends and at points within the seed-compartments, the sprocket-wheels rigidly secured to the bearing-wheels, the chain belts connecting said sprocket-wheels with the sprocket-wheels on the end of the upper transverse shaft, the cupped belts traveling on the sprocket-wheels of the upper and lower shafts within the seed-compartments, and the discharge-hopper secured upon the forward wall of the body and adapted to receive the seed from the cups of the belts and convey it to the ground, substantially as specified.

4. In a combined corn and cotton-seed-planter and fertilizer-distributer, the combination, with the crank-axle, the body or bed secured thereto, and the pole or tongue connected to said crank-axle by straps or bars, of the rearwardly-extending straps pivotally connected to the said forward straps, the transverse roller journaled in bearings adjacent to the ends of the rearwardly-extending straps, the transverse shaft rigidly secured to said straps in advance of the transverse roller, and the screw-threaded cultivator-arms depending from said transverse shaft and adapted to be adjusted vertically with relation thereto, substantially as specified.

In testimony whereof I affix my signature in presence of two witnesses.

TODD McINTIRE YARBROUGH.

Witnesses:
HOYLE TOMKINS,
L. F. JACKSON.